United States Patent [19]

Yamauchi

[11] 4,079,365
[45] Mar. 14, 1978

[54] GROUP RESPONSE AND INDICATION SYSTEM

[75] Inventor: Satoshi Yamauchi, Tokyo, Japan

[73] Assignee: Ricoh Company, Ltd., Tokyo, Japan

[21] Appl. No.: 578,966

[22] Filed: May 19, 1975

[30] Foreign Application Priority Data

May 21, 1974 Japan .................................. 49/56989
Dec. 21, 1974 Japan ................................ 49/147022

[51] Int. Cl.² .............................................. G08B 1/08
[52] U.S. Cl. .............................. 340/286 R; 35/48 R; 340/150
[58] Field of Search ................... 35/48 R; 235/92 ST; 340/153, 163, 286, 337, 150

[56] References Cited

U.S. PATENT DOCUMENTS

| | | | |
|---|---|---|---|
| 2,738,595 | 3/1956 | John et al. ............................ | 35/48 R |
| 3,118,236 | 1/1964 | Hemel .................................. | 35/48 R |
| 3,647,926 | 3/1972 | Rohloff et al. ....................... | 35/48 R |
| 3,784,979 | 1/1974 | Friedman et al. ................ | 235/92 ST |

*Primary Examiner*—David L. Trafton
*Attorney, Agent, or Firm*—Frank J. Jordan

[57] ABSTRACT

A system is provided whereby each person in a group is provided with a response unit comprising push buttons to indicate a response or answer selected from a plurality of possible answers to a question from an interrogater. A memory and indicator unit is provided to store and indicate the responses. The response units are connected in parallel to the memory unit through a unitary transmission line. The response units also comprise indicator light units to indicate the respective responses as stored in the memory unit, all of the indicator light units being connected in parallel to the memory unit through a unitary response line which may be integral with the transmission line. Scanning means sequentially scan the push buttons of the respective response units, the memory units and the indicator light units of the response units in synchronism. An absentee memory unit is also provided to indicate unused response units.

18 Claims, 17 Drawing Figures

GROUP RESPONSE AND INDICATION SYSTEM

The present invention relates to a group response and indication system for educational and statistical applications.

Systems are becoming popular in the art for use in classrooms and the like which enable students or other persons being interrogated in a group to individually communicate with the instructor or interrogater electronically. The systems generally comprise an answer or response transmitter for each person being interrogated which is provided with a plurality of switches or buttons, one for each of a plurality of possible multiple choice answers to the immediate question asked by the interrogater. The response transmitters are all electrically connected by wires to a central unit operated by the interrogater, and the responses as transmitted by the transmitters are stored in a memory in the central unit. Various operations may be performed on the responses in the central unit, such as indicating all of the responses on a panel, adding up the sum of correct responses or answers and displaying the same, calculating other statistical functions of the responses such as the percentage of correct answers, indicating which persons produced incorrect responses for the purpose of further interrogation or the like. A typical system of this type is disclosed in U.S. Pat. No. 3,647,926 to Rohloff et al. In this system, as in other known systems of the present type, the central unit comprises a memory means for each transmitter unit and each transmitter unit is connected to the respective memory means by a separate cable which may be composed of a number of wires. The obvious disadvantage of this system is the large number and complexity of wires connecting the transmitters to the central unit.

Other known systems comprise relays, particularly of the latching or holding type, which are noisy and slow in operation. Such relays comprise moving parts which are subject to mechanical malfunction. Still another defect of known systems is that many of them are not provided with feedback means to indicate to the person being interrogated that the response he selected is correctly stored in the memory means of the central unit. Mechanical and electrical malfunctions in the transmitter units or wiring connecting the transmitter unit to the central unit may result in no response being stored in the memory means or an incorrect response being stored even through the person being interrogated selected the correct response. This, however, would be unknown to him. Furthermore, the interrogater would be led to believe that the person selected the wrong response or did not respond, which would probably result in further unnecessary interrogation.

Another defect of prior art systems is that in many cases not all of the transmitter units are used. In an educational application in which the interrogater is a teacher and the persons being interrogated are students, it is common for a certain number of students to be absent. Such prior art systems do not comprise means at the central unit to indicate which students are absent. Thus, the central unit is not able to distinguish between the blank responses from unused transmitters and the blank responses from students who are not able to produce any response to the particular question from the teacher. This problem is particularly acute when the central unit is adapted to compute statistics involving the number of students who are not able to respond to the question since the blank responses would include not only the actual blank responses from the students unable to answer the question but blank responses from the unused transmitters.

It is therefore an object of the invention to provide a group response system which comprises a plurality of response transmitters which are manually actuable by persons being interrogated to indicate a selected response to the particular question, a central unit for storing the responses and indicating the same, and a transmission line means connecting the transmitters to the central unit which is formed of fewer wires than equivalent transmission line means in prior art systems.

It is another object of the invention to provide a group response system comprising scanning means for sequentially scanning the transmitters to actuate the same to transmit the selected responses to the central unit.

It is another object of the invention to provide a group response system which does not comprise relays or other mechanical storage elements.

It is another object of the invention to provide a group response system comprising indicators actuated by the scanning means at each transmitter to indicate the respective selected response as stored in the central unit.

It is another object of the invention to provide a group response system comprising means for taking a roll-call of the persons being interrogated, storing indications of the transmitters manned by persons responding to the roll-call and providing said indications to the central unit to prevent blank responses from unused transmitters from invalidating statistical calculations based on the responses.

The above and other objects, features and advantages of the invention will become clear from the following detailed description and accompanying drawings.

FIGS. 1a and 1b together represent an electrical schematic diagram, partly in block form, of a first embodiment of a group response system according to the present invention;

Figure 1A:
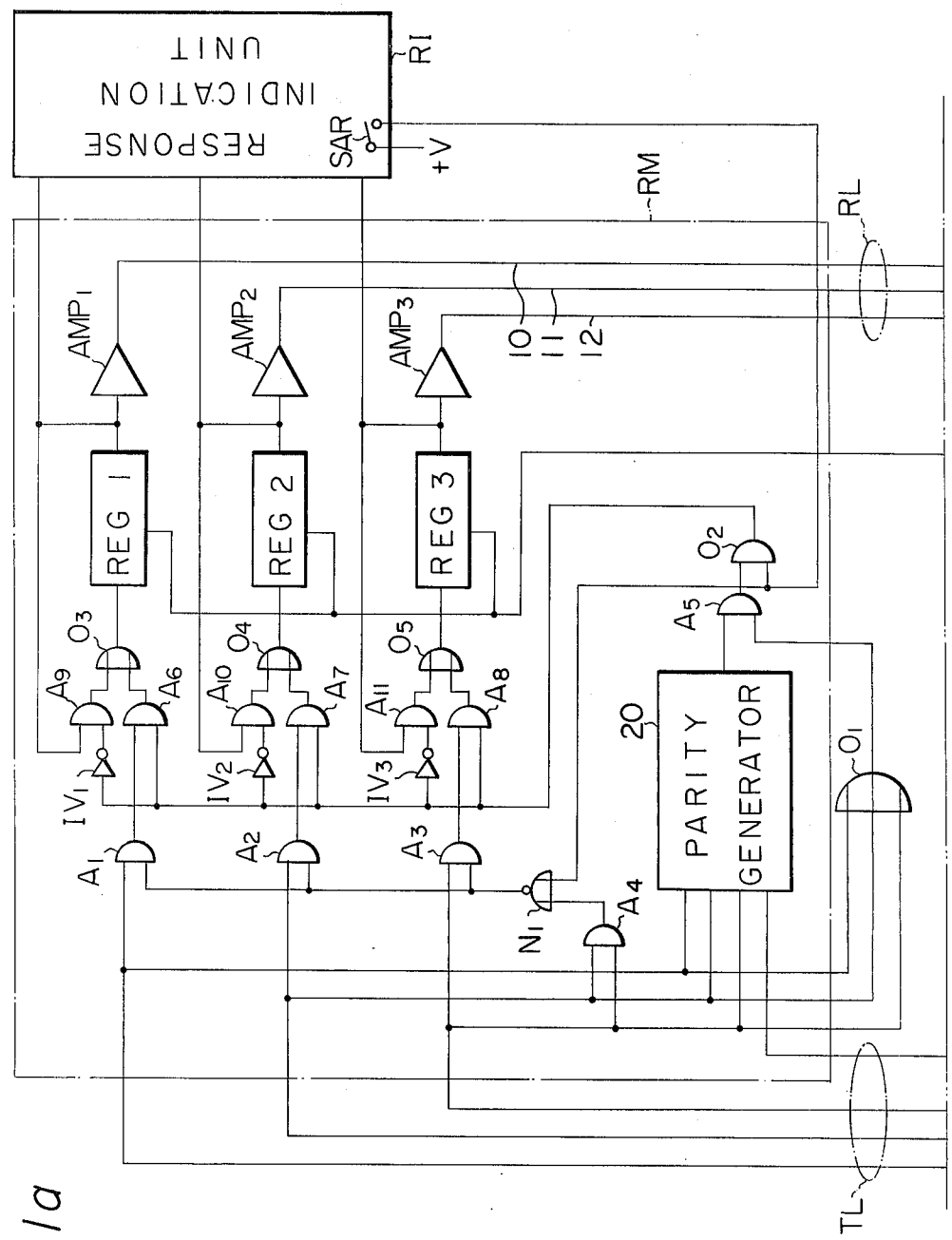
Figure 1B:
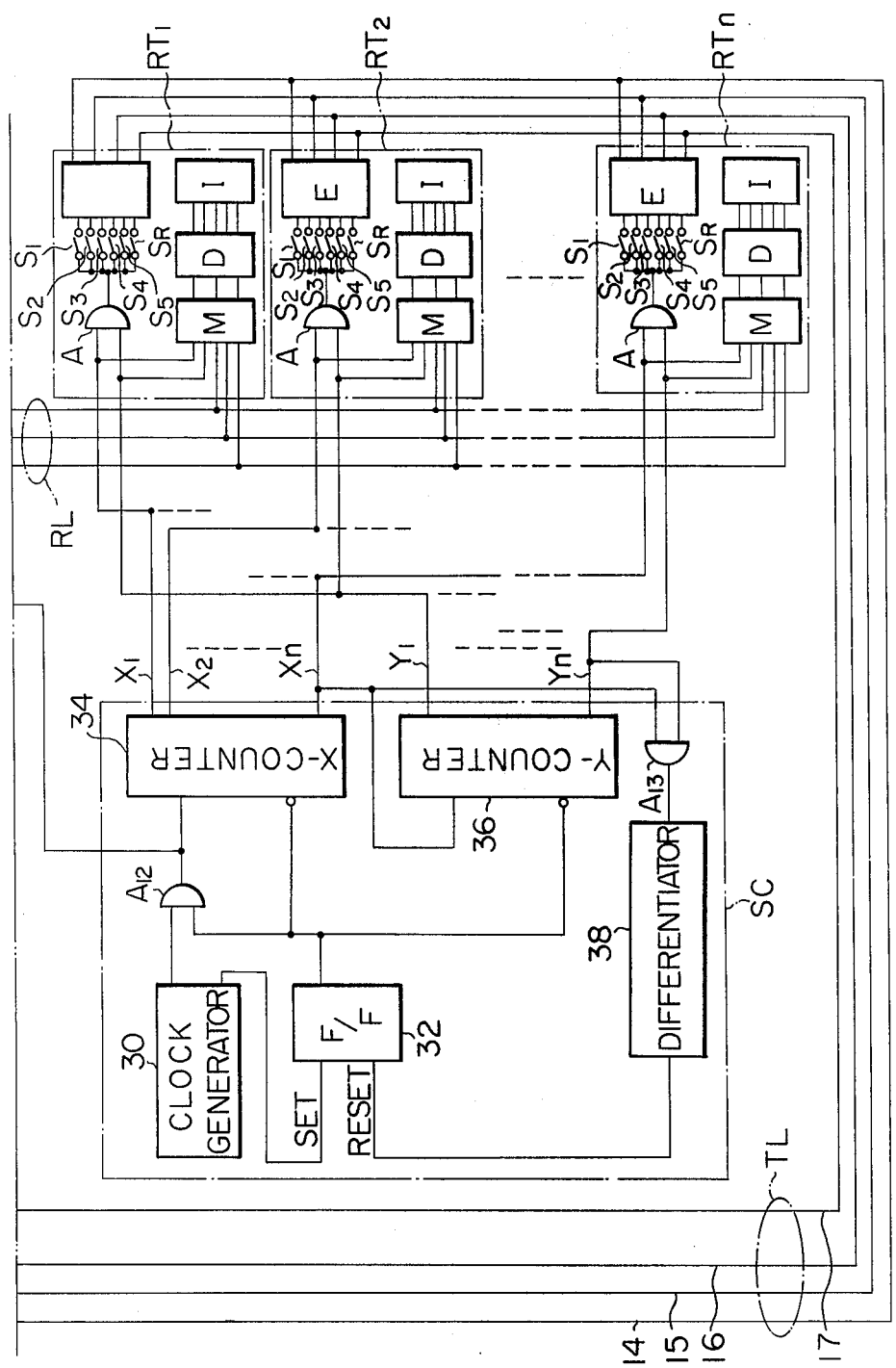

Referring now to FIGS. 1a and 1b, a group responding system embodying the invention comprises a plurality (the actual number is $n$ but only three are shown) of response transmission units RT1 to RT$n$, a response memory unit RM, a scanning unit SC and a response indication unit RI. A response line means is designated as RL and connects the output of the response memory unit RM to the inputs of the response transmission units RT1 to RTn. The line RL is composed of three wires 10, 11 and 12. Each response transmission unit RT1 to RTn comprises a response indication and storage means which includes a memory unit M, a decoder D connected to the output of the respective memory unit M and an indicator unit I connected to the output of the respective decoder D. The wires 10, 11 and 12 are connected in parallel to the inputs of all of the memory units M. The response transmitters RT1 to RTn also each comprise an AND gate A, the output of which is connected through six switches S1 to S5 and SR, which are momentary contact push button switches, to respective inputs of an encoder E. The encoders E each have four outputs which are connected in parallel through transmission line means TL comprising four wires 14 to 17 respectively to the response memory unit RM.

The response memory unit RM comprises AND gates A1 to A3, inputs of which are connected to the wires 14 to 16 respectively. The wires 15 and 16 are also connected to inputs of an AND gate A4, the output of which is connected to an input of a NOR gate N1. The output of the NOR gate N1 is connected to other inputs of the AND gates A1 to A3. The wires 14 to 16 are also connected to inputs of an OR gate O1, the output of which is connected to an input of an AND gate A5. The wires 14 to 17 are connected to inputs of a parity generator 20, the output of which is connected to another input of the AND gate A5. The output of the AND gate A5 is connected to an input of an OR gate O2. The response indicator unit RI comprises an all reset switch SAR which is normally open and connected at one end to a positive power source +V and at the other end to another input of the OR gate O2. The other end of the switch SAR is also connected to another input of the NOR gate N1.

The response memory unit RM further comprises AND gates A6, A7 and A8 having inputs connected to the outputs of the AND gates A1, A2 and A3 respectively. The output of the OR gate O2 is connected to other inputs of the AND gates A6 to A8. The outputs of the AND gates A6, A7 and A8 are connected to inputs of OR gates O3, O4 and O5 respectively.

The response memory unit RM further comprises AND gates A9, A10 and A11 having inputs connected through inverters IV1, IV2 and IV3 to the output of the OR gate O2. The outputs of the AND gates A9 to A11 are connected to inputs of the OR gates O3 to O5 respectively.

The response memory unit RM further comprises shift registers Reg1, Reg2 and Reg3, each having $n$ elements or stages, the inputs of which are connected to the outputs of the OR gates O3, O4 and O5 respectively. The outputs of the shift registers Reg1, Reg2 and Reg3 are connected to inputs of amplifiers AMP1, AMP2 and AMP3, to inputs of the AND gates A9, A10 and A11 and to inputs of the indicator unit RI respectively. The outputs of the amplifiers AMP1, AMP2 and AMP3 are connected to the wires 10, 11 and 12 respectively.

The scanning unit SC comprises a clock pulse generator 30 which produces clock pulses and feeds the same to the input of an AND gate A12. The clock pulse generator 30 also produces set pulses and feeds the same to the set input of a flip-flop 32. The "1" side output of the flip-flop 32 is connected to another input of the AND gate A12 and also to inverting reset inputs of an X-counter 34 and a Y-counter 36. The output of the AND gate A12 is connected to the count input of the X-counter 34 and also to the shift inputs of the shift registers Reg1, Reg2 and Reg3. The X-counter 34 is, for example, a decimal counter adapted to sequentially produce "1" outputs on wires X1 to Xn in response to the clock pulses. The wire Xn is connected to the count input of the Y-counter 36 to constitute a carry output. The Y-counter 36 similarly sequentially produces outputs on wires Y1 to Yn in response to the carry outputs on the wire Xn. The wires X1 to Xn and Y1 to Yn are connected to the AND gates A of the response transmission units RT1 to RTn in such a manner that the AND gates A will sequentially produce "1" outputs in response to the clock pulses as operated on by the X-counter 34 and Y-counter 36. In other words, the AND gates A of the response transmission units RT1 and RTn will produce "1" outputs in sequence.

The wires Xn and Yn are connected to inputs of an AND gate A13, the output of which is connected to an input of a differentiator 38. The output of the differentiator 38 is connected to the reset input of the flip-flop 32.

In operation, the clock pulse generator 30 continuously produces clock pulses and set pulses. The interval between the set pulses is sufficient to allow at least $n$ clock pulses to be produced between consecutive set pulses. A set pulse sets the flip-flop 32 which feeds a "1" output to the AND gates A12 to enable the same to gate clock pulses therethrough. The counters 34 and 36 were reset by a previous operation and start counting in response to clock pulses gated through the AND gate A12 to enable the AND gates A of the response transmission units RT1 to RTn in sequence. The clock pulses gated through the AND gate A12 are also applied to the shift inputs of the shift registers Reg1 to Reg3 to cause the registers to shift in synchronization with the scanning of the response transmission units RT1 to RTn by the counters 34 and 36 of the scanning unit SC.

Prior to asking a question, the interrogator will close the switch SAR to reset or clear the response memory unit RM. Specifically, the source +V will be connected to inputs of the OR gate O2 and NOR gate N1. The OR gate O2 will produce a "1" output which is applied to the AND gates A6 to A8 to enable the same. The "1" output of the OR gate O2 will be inverted by the inverters IV1 to IV3 to inhibit the AND gates A9 to A11 respectively. The +V signal is also applied to the NOR gate N1, which will produce a "0" output to inhibit the AND gates A1 to A3. The AND gates A1 to A3 therefore produce "0" outputs which are gated through the AND gates A6 to A8 and the OR gates O3 to O5 to the inputs of the shift registers Reg1 to Reg3. The shift registers Reg1 to Reg3 will be shifted by a number of clock pulses greater than $n$ so that "0" or blank codes or signals are stored in all of the memory elements of the shift registers Reg1 to Reg3. The interrogator releases the switch SAR to open same prior to commencing the interrogation.

When the switch SAR is opened, the source +V is disconnected from the OR gate O2 and NOR gate N1 so that the respective inputs thereto are "0". As will be described in detail below, the OR gate O1, parity generator 20 and AND gate A4 all produce "0" outputs so that the output of the OR gate O2 is "0" and the NOR gate N1 produces a "1" output to enable the AND gates A1 to A3 and A9 to A11. In this condition the information in the shift registers Reg1 to Reg3 is continuously recirculated through the AND gates A9 to A11.

The interrogator then asks the students or the like a question and proposes a plurality of (in this example 5) of multiple choice answers or responses. The responses are numbered from 1 to 5 and correspond to the switches S1 to S5 to the response transmission units RT1 to RTn respectively. If, for example, the student believes that the correct answer or response is number 3, he will momentarily push the switch S3 of his respective response transmission unit.

For the purpose of describing the operation of the system, it will be assumed that the response transmission unit RT2 is manned by the exemplary student. The student pushes the switch S3 to close the same. The repetition rate of the clock pulses is preferably very high, and during the time the student pushes the switch S3 of the response transmission unit RT2 the AND gate A of the response transmission unit RT2 will produce a "1" output at least once.

Each encoder E of the response transmission units RT1 to RTn is adapted to produce the following outputs or signal codes in response to closing of the switches S1 to S5 and SR on the wires 14 to 17.

| Switches | Wires | | | |
|---|---|---|---|---|
|  | 14 | 15 | 16 | 17 |
| S1 | 1 | 0 | 0 | 1 |
| S2 | 0 | 1 | 0 | 1 |
| S3 | 1 | 1 | 0 | 0 |
| S4 | 0 | 0 | 1 | 1 |
| S5 | 1 | 0 | 1 | 0 |
| SR | 0 | 1 | 1 | 0 |

It will be noted that the signals on the wires 14 to 16 constitute the binary equivalents of the decimal numbers 1 to 5 represented by the switches S1 to S5 respectively. The signals on the wire 17 are provided so that each combination or code constituted by the four signals has even parity. The reset signal corresponding to the switch SR has an exemplary code 0110. The parity generator 20 is arranged to produce a "1" or a "0" output when the parity of the signals on the lines 14 to 17 is even and odd respectively.

Closing of the switch S3 by the student manning the response transmission unit RT2 causes a signal to be gated through the AND gate A and switch S3 of the response transmission unit RT2 to the encoder E thereof only during the time when the unit RT2 is scanned or addressed by the counters 34 and 36 of the scanning unit SC. The encoder E of the unit RT2 will generate the signals 1100 on the wires 14 to 17 respectively only during this time. During other times, the other units RT1 or RT3 to RTn will generate outputs if the respective students have depressed a switch S1 to Sn of the respective response transmission units.

Since the parity on the wires 14 to 17 is even (the code 1100 has two "1"s as do all of the codes generated by the encoders E), the parity generator 20 will generate a "1" output which is fed to the AND gate A5. Since the two wires 14 and 15 have "1" signals, the OR gate O1 produces a "1" output which is fed to the AND gate A5. With two "1" inputs, the AND gate A5 produces a "1" output which is fed through the OR gate O2 to enable the AND gates A6 to A8 and inhibit the AND gates A9 to A11. Since the wires 15 and 16 do not both have "1" signals, the AND gate A4 produces a "0" output which is fed to the NOR gate N1. With two "0" inputs the NOR gate N1 produces a "1" output to enable the AND gates A1 to A3. As a result, the "1" signal on the wire 14 is gated through the AND gate A1, AND gate A6 and OR gate O3 and stored in the leading stage of the shift register Reg1. The "1" signal on the wire 15 is gated through the AND gates A2 and A7 and the OR gate O4 and stored in the shift register Reg2. The "0" signal on the wire 16 is gated through the AND gates A3 and A8 and the OR gate O5 and stored in the shift register Reg3. This process is sequentially repeated for all of the response transmisson units RT1 to RTn in syncronism as controlled by the clock pulses and outputs of the counters 34 and 36 of the scanning unit SC. Furthermore, the process is identical regardless of whether the student enters an initial response or changes his response.

To reset or delete a response, the student pushes the reset switch SR so that the encoder E generates the code 0110 on the lines 14 to 17 respectively. The parity generator 20 and OR gate O1 produce "1" outputs to enable the AND gates A6 to A8 as in the case of entering a response. However, since the signals on the lines 15 and 16 are both "1", the AND gate A4 produces a "1" output which is applied to the NOR gate N1 which produces a "0" output to inhibit the AND gates A1 to A3. The effect is the same as for the case described above in which the interrogator or teacher closes the switch SAR to reset the entire response memory unit RM in that a "0" or blank will be stored in the shift registers Reg1 to Reg3. However, as soon as the scanning unit SC actuates the next response transmission unit the encoder E of the previously actuated unit will cease to generate the code 0110 and the reset operation for the previously actuated unit will terminate.

The outputs of the amplifiers AMP1 to AMP3 are connected through the wires 10 to 12 to the memory units M of the response transmission units RT1 to RTn. It will be noted from the above description that the counters 34 and 36 are connected to the memory units M so that they will be actuated in synchronism with the respective AND gates A. The memory units M store the outputs of the shift registers Reg1 to Reg3 when actuated, and the decoders D decode the contents of the memory units M and feed them to the indicator units I for display. Although not shown, the indicator units I each comprise lamps corresponding to the switches S1 to S5 and Sr. The student or other person being interrogated can thereby be sure that his response is correctly stored in the response memory unit RM and that his respective response transmission unit and wires are not broken. The memory units M will be described in detail below.

In the case of odd parity on the wires 14 to 17 which may result from noise or the like, the parity generator 20 produces a "0" output which inhibits the AND gate A5 even through the output of the OR gate O1 is "1". This will cause the shift registers Reg1 to Reg3 to recirculate through the AND gates A9 to A11 respectively until even parity is restored.

Figure 2A:
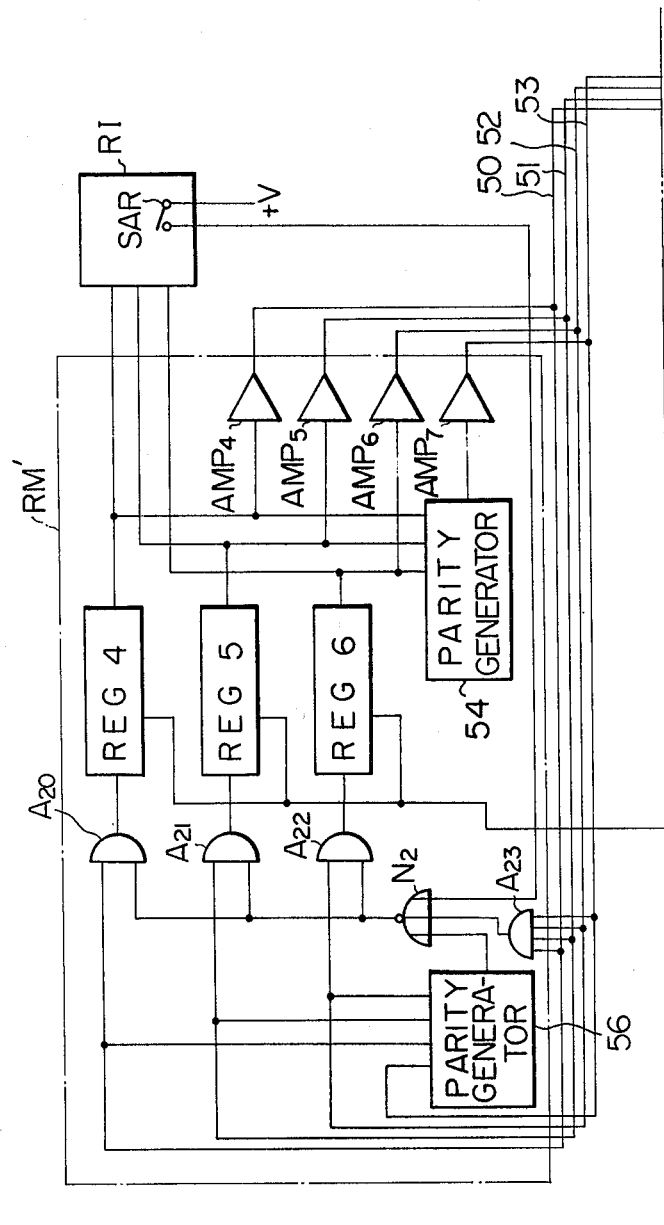
FIGS. 2a and 2b are similar to FIGS. 1a and 1b but show a second embodiment.
Figure 2B:
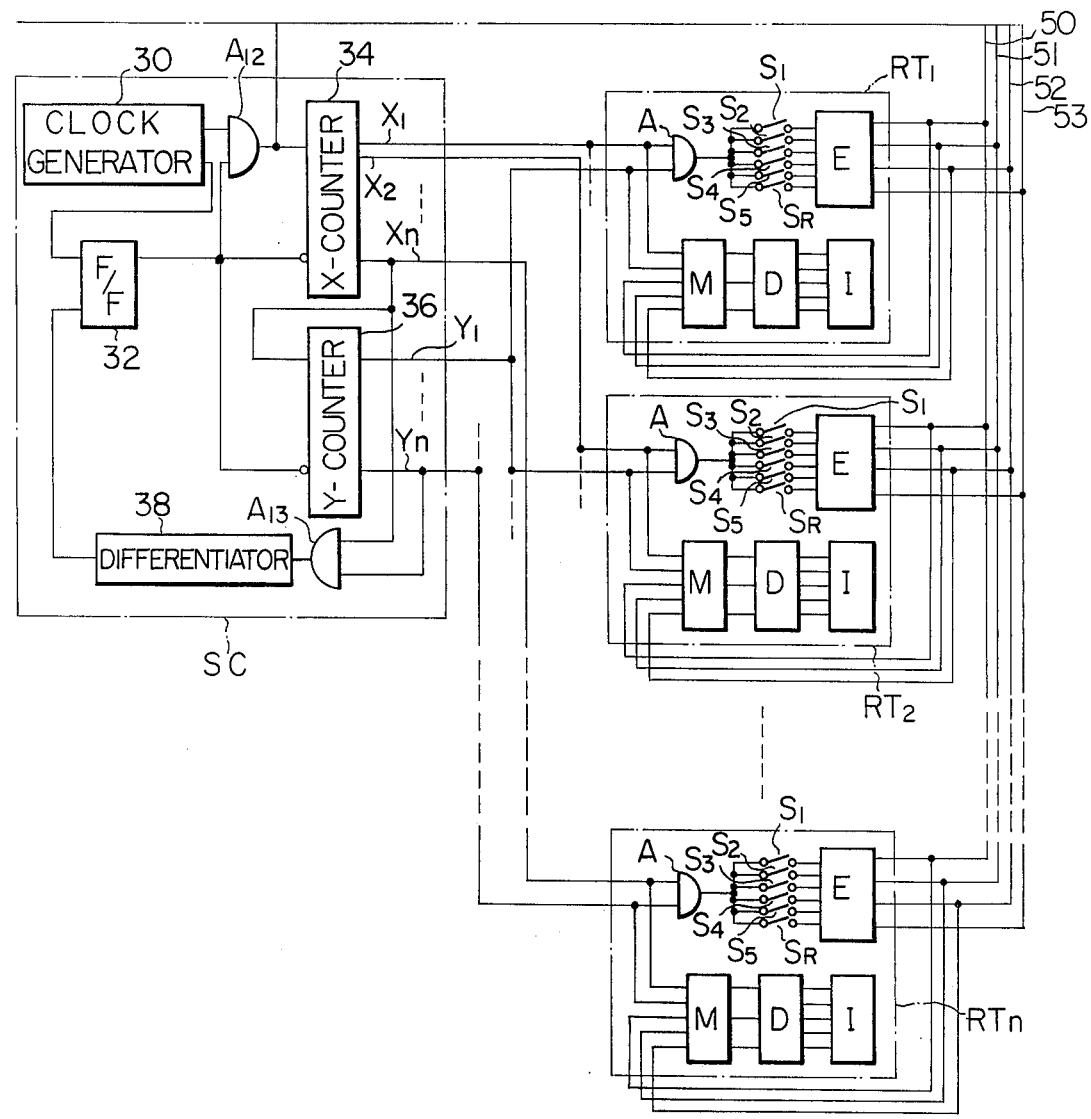

In the embodiment of FIGS. 2a and 2b, the scanning unit SC, response indicator unit RI and response transmission units RT1 to RTn are identical in construction and function to those shown in FIG. 1 and are designated by the same reference numerals. The wires 10 and 14, 11 and 15 and 12 and 16 have been replaced by integral wires 50, 51 and 52 respectively. The wire 17 is replaced by a wire 53.

It will be noticed that only four wires are required to connect the response transmission units RT1 to RTn to a response memory unit RM' in the embodiment of FIGS. 2a and 2b whereas 7 wires are required in the embodiment of FIGS. 1a and 1b.

Shift registers Reg4 to Reg6 are identical to the shift registers Reg1 to Reg3 in the embodiment of FIGS. 1a and 1b. Amplifiers AMP4 to AMP6 are identical to the amplifiers AMP1 to AMP3. A parity generator 54 adapted to produce a "1" output in response to odd parity is connected to the outputs of the shift registers Reg4 to Reg6. The output of the parity generator 54 is connected to the input of an amplifier AMP7, the output of which is connected to the wire 53. The inputs of the shift registers Reg4 to Reg6 are connected to outputs of AND gates A20 to A22 respectively. Inputs of the AND gates A20 and A22 are connected to the wires 50 to 52 respectively. A parity generator 56 has inputs connected to the wires 50 to 53 and is adapted to produce a "1" output in response to odd parity. The output of the parity generator 56 is connected to an input of a NOR gate N2, the output of which is connected to inputs of the AND gates A20 to A22. The switch SAR is connected to another input of the NOR gate N2. An AND gate A23 has inputs connected to all of the wires 50 to 53 and an output connected to an input of the NOR gate N2. The output of the AND gate A12 is connected to the shift inputs of the shift registers Reg4 to Reg6 as in FIGS. 1a and 1b.

One skilled in the art will immediately recognize that in the embodiment of FIGS. 1a and 1b, the NOR gate N1 acts as a sensor to detect an all reset command from the interrogator represented by closing the switch SAR. The AND gate A4 acts as a decoder to detect an individual response transmission unit reset or delete command represented by closing the respective switch SR. In a similar manner the OR gate O1 acts as a decoder to detect a new response entry command represented by closing a switch S1 to S5. In the embodiment of FIGS. 2a and 2b, these sensing functions are performed by the parity generator 56 in combination with the AND gate A23 and NOR gate N2 as will become clear from the following description.

When the interrogator decides to clear the entire memory unit RM', he closes the switch SAR as described above. The +V signal applied to the NOR gate N2 through the switch SAR causes the NOR gate N2 to produce a "0" output to inhibit the AND gates A20 to A22 and prevent signals from reaching the inputs of the shift registers Reg4 to Reg6. Since the shift registers Reg4 to Reg6 are continuously shifted by the clock pulses, "0's" will be stored in all stages of the shift registers Reg4 to Reg6.

The outputs of the amplifiers AMP4 to AMP7 and the outputs of the encoders E of the response transmission units RT1 to RTn are of high impedance so that if either one or both of the outputs of an amplifier and encoder connected to the same wire 50 to 53 is high the signal on the line will be high or "1". Based on this principle, the operation of the system of FIGS. 2a and 2b will be described in detail.

When a student decides to enter an initial response, the output of the shift registers Reg4 to Reg6 for the respective stage or memory element will be initially "0". The outputs of the amplifiers AMP4 to AMP6 will also be "0". The parity generator 54 will generate a "0" so that the output of the amplifier AMP7 is also "0". The student then closes the switch designating his choice of a response, for example S2. The encoder E generates the code 0101 on the wires 50 to 53 respectively, which is applied to the inputs of the parity generator 56. Since the parity is even, the parity generator 56 will generate a "0" output which causes the NOR gate N2 to produce a "1" output to enable the AND gates A20 to A22. The code or signals 010 is thereby stored in the shift registers Reg4 to Reg6 through the AND gates A20 to A22 respectively and also applied to the memory units M through the wires 50 to 53 for indication. The code 010 is applied from the shift registers Reg4 to Reg6 to the parity generator 54 which generates a "1" since the parity is odd. The outputs of the amplifiers AMP4 to AMP7 are thereby identical to the outputs of the encoder E of the respective response transmission unit, and a recirculation loop is created for the shift registers Reg4 to Reg6 through the AND gates A20 to A22. This recirculation loop provides the same function as the recirculation loops through the AND gates A9 to A11 of the embodiment of FIG. 1.

To change the response from 2 to, for example, 3, the student pushes the switch S3 so that the encoder E generates the code 1100. This is combined with the code 0101 from the amplifiers AMP4 to AMP7 to produce a composite code 1101 having odd parity. In response, the parity generator 56 generates a "1" output so that the NOR gate N2 produces a low output to inhibit the AND gates A20 to A22. Blank or "0" signals are thereby stored in the shift registers Reg4 to Reg6 and the output of all of the amplifiers AMP4 to AMP7 becomes "0". During the next cycle of the shift registers Reg4 to Reg6, the "0" outputs of the amplifiers AMP4 to AMP7 will be combined with the output of the encoder E to produce the code 1100 on the wires 50 to 53. Since the parity is even, the parity generator 56 will produce a "0" output so that the NOR gate N2 will produce a "1" output to enable the AND gates A20 to A22 and gate the new response code into the shift registers Reg4 to Reg6. The student reset operation represented by closing the switch SR is identical to entering a new response since the combination of the reset code 0110 with another code will produce odd parity.

The combination of two codes in the above table will produce odd parity in all except the following cases.

| | |
|---|---|
| 1 + Reset | = (1001) + (0110) = (1111) |
| 2 + 5 | = (0101) + (1010) = (1111) |
| 3 + 4 | = (1100) + (0011) = (1111) |

The AND gate A23 serves as a decoder to detect these three cases and apply a "1" output to the NOR gate N2 to produce a "0" output therefrom to inhibit the AND gates A20 to A22 even though the parity generator 56 produces a "0" output. Thus, the AND gates 20 to 22 will be inhibited as desired by any combination of two different outputs from the amplifiers AMP4 to AMP7 and an encoder E of an actuated response transmission unit RT1 to RTn.

Figure 3:
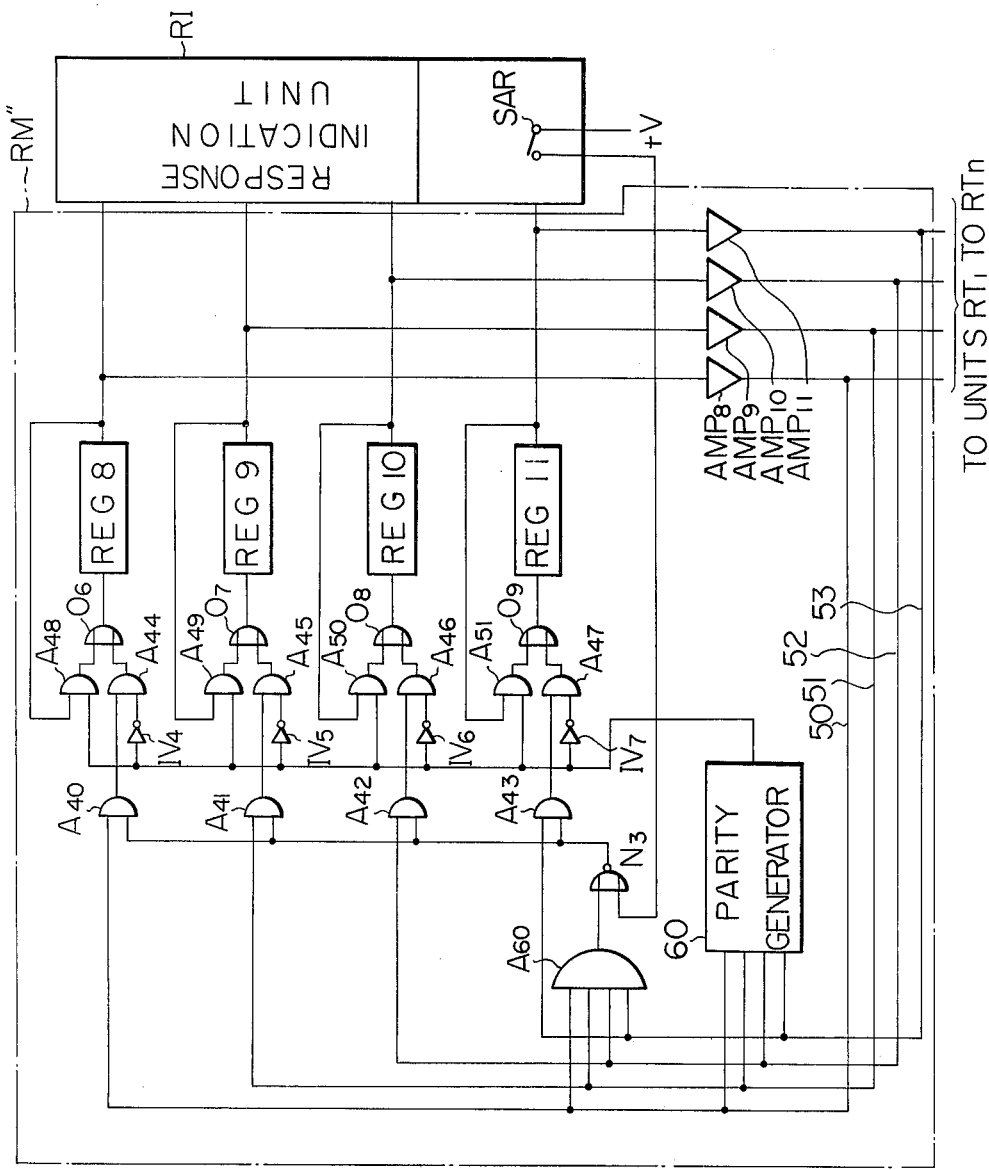
FIG. 3 is a partial electrical schematic diagram illustrating a third embodiment of the invention.

Referring now to FIG. 3, a third embodiment of the invention is identical to the embodiment shown in FIGS. 2a and 2b in that the scanning unit SC and the response transmission units RT1 to RTn are generally identical and are not shown. The only difference is that the encoders E of the response transmission units RT1 to RTn are adapted to generate the code 1111 when the switch SR is closed rather than the code 0110 as in the previous embodiments. The embodiment of FIG. 3 is advantageous in that is more resistant to noise than the embodiment of FIGS. 2a and 2b, since the parity generator, which is somewhat sensitive to noise in high speed applications, is used only as a parity checker rather than a sensor for detecting a new response entry or student reset command. It will be noted while referring to the description of the FIG. 3 embodiment that if the FIGS. 2a and 2b embodiment is operated in the same manner, the parity generator 56 may be omitted since the sensing function is performed by the AND gate A23 which functions as a decoder.

In FIG. 3, the wires 50 to 53 are connected to outputs of amplifiers AMP8 to AMP11, to inputs of AND gates A40 to A43, to inputs of an AND gate A60 and to inputs of a parity generator 60 of a response memory unit RM respectively. The wires 50 to 53 are also connected to the response transmission units RT1 to RTn in an identical manner to the embodiment of FIGS. 2a and 2b although the connection is not shown. The switch SAR and the output of the AND gate A60 are connected to inputs of a NOR gate N3, the output of which is connected to other inputs of the AND gates A40 to A43. The outputs of the AND gates A40 to A43 are connected to inputs of AND gates A44 to A47, the outputs of which are connected to inputs of OR gates O6 to O9 respectively. The outputs of the OR gates O6 to O9 are connected to inputs of shift registers Reg8 to Reg11, the outputs of which are connected to inputs of the amplifiers AMP8 to AMP11 respectively and to inputs of the response indicator RI. The shift inputs of the shift registers Reg8 to Reg9 are connected to the scanning unit SC in an identical manner to the embodiment of FIGS. 2a and 2b although the connection is not shown.

The parity generator 60 is adapted to generate a "1" output for odd parity, and its output is connected through inverters IV4 to IV7 to inputs of the AND gates A44 to A47 respectively. The outputs of the shift registers Reg8 to Reg11 are connected to inputs of AND gates A48 to A51 respectively, the outputs of which are connected to inputs of the OR gates O6 to O9. The output of the parity generator 60 is connected to inputs of the AND gates A48 to A51.

When a reset or new response entry is not being performed, the signals on the wires 50 to 53 will constitute even parity so that the parity generator 60 produces a "0" output which enables the AND gates A44 to A47 and inhibits the AND gates A48 to A51. Since two or less of the wires 50 to 53 has a "1" signal, the AND gate A60 produces a "0" output. Since the switch SAR is open, both inputs to the NOR gate N3 are "0" and the NOR gate N3 produces a "1" output to enable the AND gates A40 to A43. The shift registers Reg8 to Reg11 thereby continuously recirculate through the amplifiers AMP8 to AMP11, AND gates A40 to A43, AND gates A44 to A47 and OR gates O6 to O9 respectively.

When the interrogator decides to clear the response memory unit RM", he closes the switch SAR thereby applying the +V signal to the NOR gate N3 which produces a "0" output to inhibit the AND gates A40 to A43. Shifting of the shift registers Reg8 to Reg11 by a number of times greater than n in response to the clock pulses from the scanning unit SC results in storing blanks or "0's" in all of the stages of the shift registers Reg8 to Reg11.

When a student decides to reset or delete his response, he closes his switch SR so that his particular encoder E generates the code 1111 on the wires 50 to 53. These signals are applied to the AND gate A60 which produces a "1" output which is fed to the NOR gate N3. The NOR gate N3 produces a "0" output to inhibit the AND gates A40 to A43 so that the next shift of the shift registers Reg8 to Reg11 will store a blank or "0" in the respective stage of all of them.

The operation for changing a response is different from the embodiments of FIGS. 1a, 1b, and 2a, 2b. Prior to beginning the interrogation, the interrogator must command the persons he is interrogating to, prior to pushing a swtich S1 to S5 to change their response, momentarily push the switch SR. Such an operation will be described in the exemplary case in which the student or other person being interrogated has pshed his swich S2 to enter a response number 2. He then reconsiders his choice and decides to change his response to 4. Prior to changing the response, the signals on the wires 50 to 53 are 0101 respectively corresponding to number 2. In conformance with the command of the interrogator, the student or the like first pushes the switch SR so that his encoder E generates the code 1111 which is applied to the AND gate A60. The first part of this operation is identical to the student reset operation described above and results in a "0" being stored in the respective stages of the shift registers Reg8 to Reg11.

The student then releases the switch SR and pushes the switch S4 indicating his new response number 4. His encoder E generates the code 0011 on the wires 50 to 53. Since the outputs of the amplifiers AMP8 to AMP11 are all "0", the code 0011 is applied without modification to the AND gates A40 to A43. Since the outputs of the AND gate A60, switch SAR and parity generator 60 are all "0", the NOR gate N3 produces a "1" output to enable the AND gates A40 and the "0" parity generator 60 output enables the AND gates A44 to A47 and inhibits the AND gates A48 to A51. The code 0011 is thereby gated through the AND gates A40 to A43, AND gates A44 to A47 and OR gates O6 to O9 and stored in the shift registers Reg8 to Reg11 respectively.

In the event of a parity error such as might be caused by noise which would introduce a "1" signal onto a wire 50 to 53 which should correctly carry a "0" signal, the parity on the wires 50 to 53 will become odd. This condition is sensed by the parity generator 60 which produces a "1" output. This "1" output inhibits the AND gates A44 to A47 and enables the AND gates A48 to A51. The contents of the shift registers Reg8 to Reg11 are thereby recirculated through an alternate path through the AND gates A48 to A51 respectively. In this manner, the erroneous signals on the wires 50 to 53 are not applied to the inputs of the shift registers Reg8 to Reg11 as long as they are present.

Figure 4A:
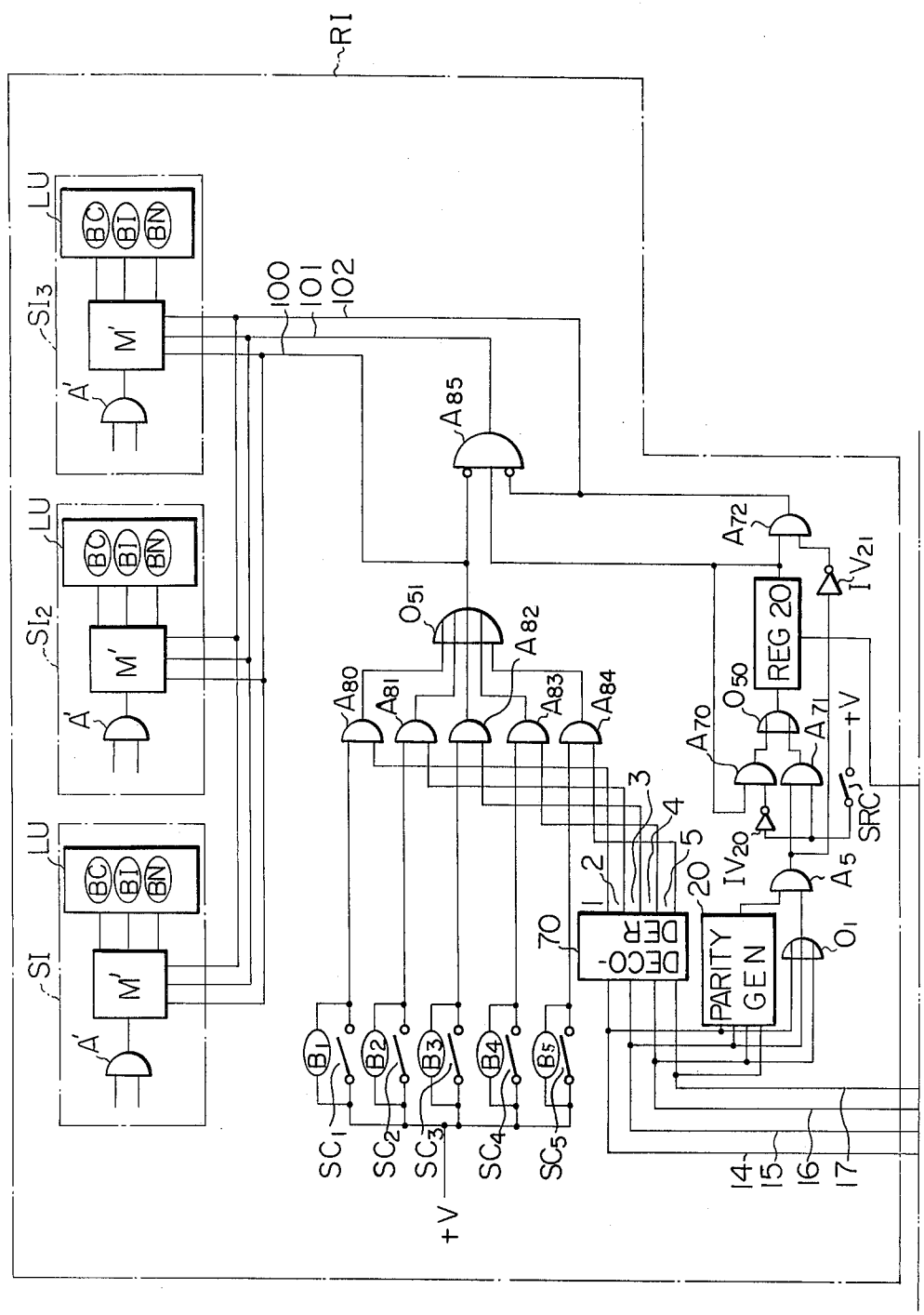
FIG. 4a and 4b show part of the group responding system shown in FIG. 1a and 1b and in addition show in a electrical schematic form an absentee sensing unit and a response indication unit.
Figure 4B:
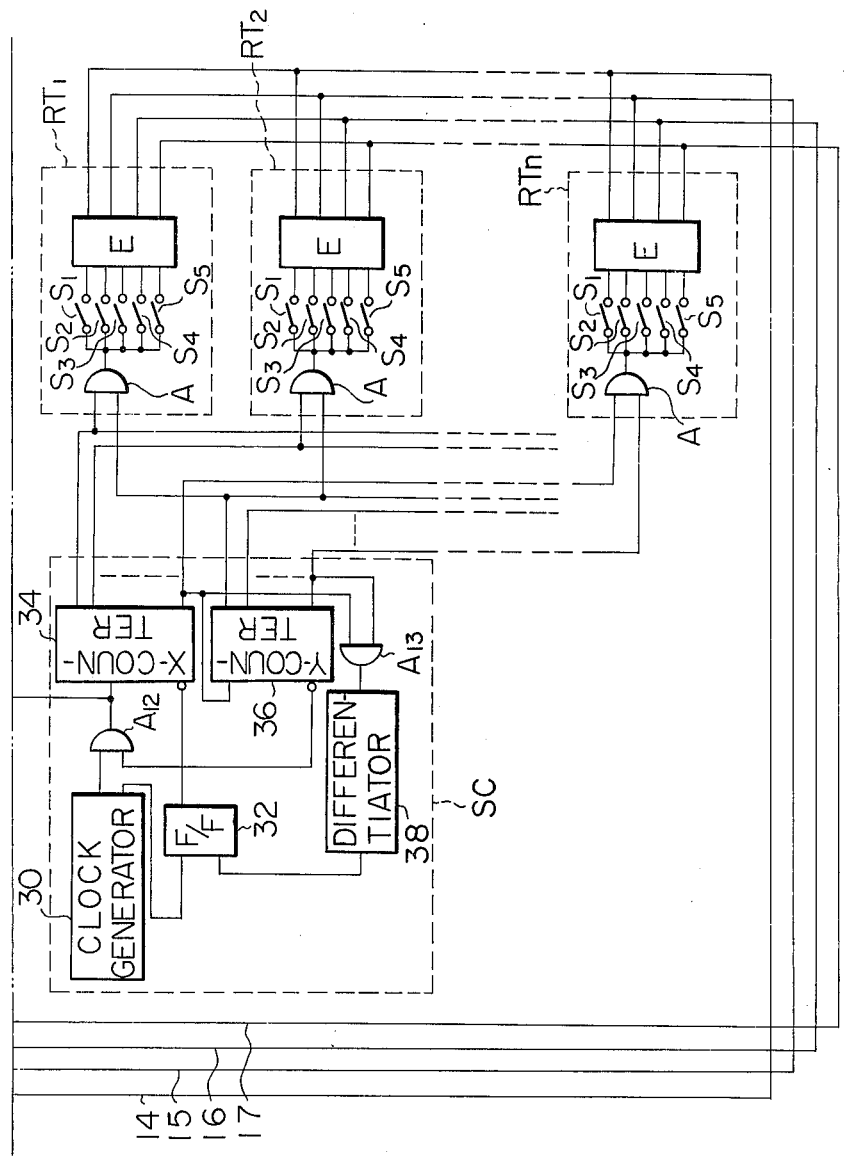

The response indicator RI comprises absentee sensing means to indicate which response transmission units are not manned, which are shown in FIGS. 4a and 4b. Also shown in FIGS. 4a and 4b are various components of the embodiment of the system shown in FIGS. 1a and 1b in which identical elements are designated by the same reference numerals. Components which do not relate to the immediate description are omitted for simplicity of illustration.

Referring now to FIGS. 4a and 4b, the output of the AND gate A5, which is connected to the input of the OR gate O2 (see FIGS. 1a and 1b), is also connected to inputs of an AND gate A71 and an inverter IV21. The output of the AND gate A71 is connected to an input of an OR gate O50, the output of which is connected to the input of a shift register Reg20. The shift input of the shift register Reg20 is connected to the output of the AND gate A12, and the output of the shift register Reg20 is connected to inputs of AND gates A70 and A72. The output of the inverter IV21 is connected to another input of the AND gate A72, and the output of the AND gate A70 is connected to another input of the OR gate O50. A roll-call switch SRC is connected at one end to the source +V and at the other end directly to an input of the AND gate A71 and through an inverter IV20 to an input of the AND gate A70.

The wires 14 to 17 are connected to inputs of a decoder 70, which produces the decimal equivalents of the binary inputs on the wires 14 to 16 on wires designated by the numbers 1 to 5 corresponding to the number of the response of the particular student whose response transmission unit is being scanned by the scanning unit SC. The output wires of the decoder 70 designated 1 to 5 are connected to inputs of AND gates A80 to A84 respectively.

During an interrogation, the interrogator presses one of latching switches SC1 to SC5 to indicate the correct response corresponding to the numbers 1 to 5 respectively. The switches SC1 to SC5 are connected at one end to the source +V and at their other ends to inputs of the AND gates A80 to A84 respectively. The outputs of the AND gates A80 to A84 are connected to inputs of an OR gate O51, the output of which is connected to an inverting input of an AND gate A85. Lamps B1 to B5 are connected across the switches SC1 to SC5 respectively to indicate to the interrogator which of the switches SC1 to SC5 he has pushed and thereby the correct response or answer to the immediate question.

The output of the shift register Reg20 is connected to an input of the AND gate A85, and the output of the AND gate A72 is connected to another inverting input of the AND gate A85.

The output of the OR gate O51 is connected to a wire 100, and a "1" signal on the wire 100 indicates a correct response to the question. The output of the AND gate A85 is connected to a wire 101, and a "1" signal on the wire 101 indicates an incorrect response. The output of the AND gate A72 is connected to a wire 102, and a "1" signal on the wire 102 indicates no response from a manned response transmission unit.

The response indication unit RI further comprises student indicator units SI1 to SIn, or one for each response transmission unit RT1 to RTn respectively. Each student indicator unit comprises a memory M' connected to all of the wires 100, 101 and 102 and a lamp unit LU connected to the output of the respective memory M'. Each lamp unit LU is provided with three bulbs or lamps BC, BI and BN. A lighted bulb BC indicates a correct response. A lighted bulb BI indicates an incorrect response and a lighted bulb BN indicates no response. When none of the bulbs BC, BI and BN are lighted, the indication is of an unmanned respective response transmission unit.

Each student indicator unit SI1 to SIn further comprises an AND gate A' having two inputs. The inputs of the student indicator units ST1 to STn are connected to the same outputs of the counters 34 and 36 as the AND gates A of the respective response transmission units RT1 to RTn so that the respective student indicator units ST1 to STn and response transmission units RT1 to RTn are scanned or actuated in synchronism by the scanning unit SC.

Prior to the beginning of an actual interrogation, the interrogator holds a roll-call. The interrogator closes the roll-call switch SRC which applies a "1" signal to the input of the AND gate A71 and to the input of the inverter IV20 to enable the AND gate A71 and inhibit the AND gate A70. The interrogator then commands the persons he is interrogating to push any of the switches S1 to S5 of their respective response transmission units RT1 to RTn. As the response transmission units RT1 to RTn are scanned by the scanning unit SC and the shift register Reg20 is shifted in synchronism therewith, the OR gate O1 and thereby the AND gates A5 and A71 will produce "1" outputs in response to a "1" signal on any of the wires 14 to 17 produced by the closing of a switch S1 to S5. This will result in a "1" signal being stored in the respective stage of the shift register Reg20 indicating that the respective response transmission unit RT1 to RTn is manned by one of the persons being interrogated. After a period of time (a few seconds) which is sufficient for all of the students or the like to push the switches of their response transmission units RT1 to RTn, the interrogator releases the switch SRC to open the same. This results in a "0" signal being applied to the inputs of the AND gate A71 and inverter IV20 to inhibit the AND gate A71 and enable the AND gate A70. The shift register Reg20 thereby contains a "1" signal indicating each manned response transmission unit RT1 to RTn and a "0" signal representing each unmanned response transmission unit RT1 to RTn. These signals are recirculated through the AND gate A70 in synchronism with the scanning of the response transmission units RT1 to RTn in such a manner that the signal indicating whether or not a response transmission unit RT1 to RTn is manned appears at the output of the shift register Reg20 at the same time the respective response transmission unit RT1 to RTn is being scanned by the scanning unit SC.

The following description is of the exemplary case in which the response transmission unit RT2 is being scanned by the scanning unit SC and the interrogator closes the switch SC3 indicating that the correct response to his question corresponds to number 3. The bulb B3 is lit indicating the correct response 3. This exemplary case is completely representative of the operation of the system shown in FIGS. 4a and 4b.

The first possibility is that the student or the like realizes that the correct response is number 3 and pushes the switch S3 so that his encoder E produces the code 1100 on the lines 14 to 17 respectively. In response, the decoder 70 produces a "1" output which is applied to the input of the AND gate A82 connected to the output wire of the decoder 70 designated as 3. Since the switch SC3 is closed, both inputs to the AND gate A82 are "1" so the AND gate A82 produces a "1" output which is fed through the wire 100 to the memory M' of the student indicator ST2. The output of the memory M' (not designated) connected to the correct response bulb BC will be "1" to light the correct response bulb BC.

In this case, since the response transmission unit RT2 is manned, the respective signal in the shift register Reg20 is "1", which is applied to the inputs of the AND gates A72 and A85. Since a "1" signal is present on the wires 14 and 15, the OR gate O1 and thereby the AND gate A5 will produce "1" outputs. The inverter IV21 will produce a "0" output so that the AND gate A72 will produce a "0" output on the wire 102 to prevent lighting of the no response bulb BN. Since the high output of the OR gate O51 is inverted by the inverting input of AND gate A85, the AND gate A85 will produce a "0" output on the wire 101 to prevent lighting the incorrect response bulb BI.

The next possibility is that the student produces an incorrect response, for example 4 by pushing the switch S4. The student's encoder E will generate the code 0011 which is decoded by the decoder 70 which produces a "1" output at its output wire designated as 4 which is applied to the input of the AND gate A83. However, since the switch SC4 is open, the other input to the AND gate A83 is "0" and the AND gate feeds a "0" output to the inverting input of the AND gate A85. Since the response transmission unit RT2 is manned, the output of the shift register Reg20 is high and is applied to the input of the AND gate A85. Since the student made a response, the AND gate A72 will produce a "0" output which is applied to the inverting input of the AND gate A85. The AND gate A85 thereby produces a "1" output on the wire 101 to light the bulb BI indicating an incorrect response. Since none of the AND gates A80 to A84 produces a "1" output, the OR gate O51 will produce a "0" output on the wire 100 so that the correct response bulb BC will not be lighted. Since the output of the AND gate A72 is "0", the signal on the wire 102 will be "0" so that the no response bulb BN will not be lighted.

The next possibility is that the student manning the response transmission unit RT2 simply does not produce a response to the question from the interrogator. In this case the decoder 70 will produce all "0" outputs so that the AND gates A80 to A84 and the OR gate 51 will similarly produce "0" outputs. The correct response bulb BC will therefore not be lighted. Since none of the signals on the wires 14 to 17 is "1", the output of the OR gate O1 and thereby the AND gate A5 will also be "0". This "0" signal is inverted by the inverter IV21 to produce a "1" signal at the input of the AND gate A72. Since the response transmission unit RT2 is actually manned, the output of the shift register Reg20 will be "1" so that the AND gate A72 will produce a "1" output on the wire 102 to light the no response bulb BN. Since the output of the AND gate A72 is "1" and this signal is inverted by the inverting input of the AND gate A85, the output of the AND gate A85 will be "0" and the incorrect response bulb BI will not be lit.

The last possibility is that the response transmission unit is unmanned. In this case the decoder 70 will produce all "0" outputs so that the correct response bulb BC will not be lighted as described above. Since the output of the shift register Reg20 is "0" indicating an unmanned response transmission unit, RT2, the AND gate A85 will produce a "0" output so that the incorrect response bulb BI will not be lit. The AND gate A72 will similarly produce a "0" output so that the no response bulb BN will not be lit. Since none of the bulbs BC, BI and BN are lit, the student indicator unit ST2 indicates to the interrogator that the response transmission unit RT2 is unmanned or that the respective student is absent.

Figure 5:
FIG. 5 is a timing chart of signals used in the embodiments shown in FIGS. 1a, 1b, 2a, 2b and 3.

The operation of the memory units M of the response transmission units RT1 to RTn will be described hereinbelow with reference to FIGS. 5, 6, 7a – 7d, 8, and 9a – 9c. In FIG. 5, the clock pulses are shown as being generated by the scanning unit SC during a time interval T1 at a repetition period of t2 and having a pulse width of t1. The period of the set pulses is designated as T2.

Figure 6:
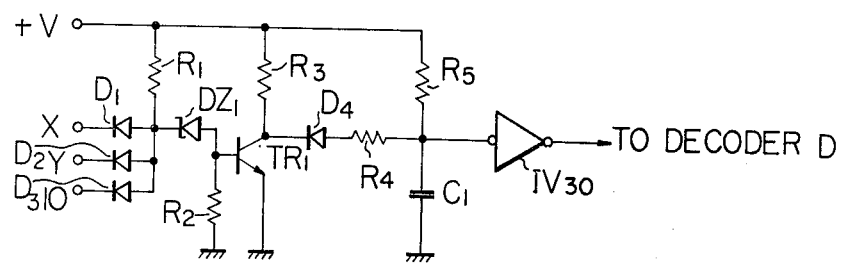
FIG. 6 is an electrical schematic diagram of a response transmitter unit memory subunit shown in FIGS. 1a and 1b.

FIG. 6 shows a first embodiment of one of the subunits in a memory unit M. Three of the subunits (no numeral) are provided for each of the wires 10, 11 and 12, although only the subunit for the wire 10 is shown. The output wires of the counters 34 and 36 for the respective response transmission unit RT1 to RTn are designated as x and y. The subunit comprises diodes D1, D2 and D3 whose cathodes are connected to the wires x, y and 10 and whose anodes are commonly connected through a resistor R1 to the source +V to constitute an AND gate (not designated). The anodes of the diodes D1, D2 and D3 and also connected to the cathode of a zener diode DZ1, the anode of which is grounded through a resistor R2. The anode of the zener diode DZ1 is also connected to the base of an NPN transistor TR1, the emitter of which is grounded. The collector of the transistor TR1 is connected to the source +V through a resistor R3 and also to the cathode of a diode D4. The anode of the diode D4 is connected through a resistor R4 and a capacitor C1 to ground. The junction between the resistor R4 and the capacitor C1 is connected to the source +V through a resistor R5 and also to the input of an inverter IV30. The output of the inverter IV30 is connected to the respective input of the decoder D.

Referring also to FIGS. 7a to 7d, the inverter IV30 is adapted to produce a "1" output when its input voltage is less than +V/2 and a "0" output when its input voltage is greater than +V/2. When any one of the signals on the wires x, y and 10 is "0", the voltage appearing at the base of the transistor TR1 will be close to zero whereby the transistor TR1 will be cut off. The transistor TR1 output voltage will be close to +V so that the capacitor C1 will be charged to a voltage close to +V. This voltage applied to the inverter IV30 will cause the inverter IV30 to produce a continuous "0" output.

Figure 7A:
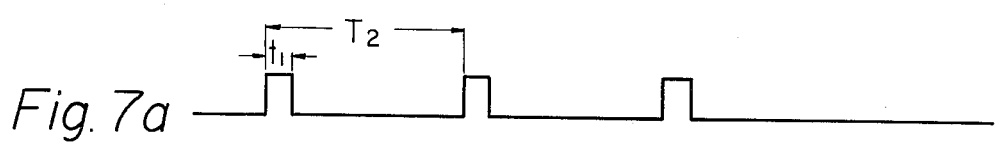
FIGS. 7a to 7d represent a timing chart of signals used in the subunit shown in FIG. 6.
Figure 7B:
Figure 7C:

Various configurations of the subunit shown in FIG. 6 are possible. In the first case it will be assumed that R4/R5 < t1/T2. When the signals on the wires x, y and 10 are all "1", a high voltage will be applied to the base of the transistor TR1 causing the same to conduct. The collector voltage of the transistor TR1 will drop close to zero and the capacitor C1 will discharge at a high rate as shown in FIG. 7b. After the clock pulse is terminated (after the time t1), the transistor TR1 will again produce a high voltage at its collector causing the capacitor C1 to charge through the resistor R5 at a slower rate as shown by the broken line curve in FIG. 7b. The next clock pulse will again cause the transistor TR1 to conduct and discharge the capacitor C1 through the resistor R4. As shown in FIG. 7b, the broken line curve does not rise above the value +V/2 until the signal on the wire 10 is made "0". The inverter IV30 will therefore produce a continuous "1" output as long as the signal on the wire 10 is "1" as shown in FIG. 7c.

Figure 7D:

In a second example, the values of the resistors R4 and R5 are selected so that R4/R5 > t1/T2. In this case the capacitor C1 charges faster through the resistor R5 after the time t1 so that the voltage across the capacitor C1 exceeds the voltage +V/2 for part of the time interval T2 as shown by the solid line curve in FIG. 7b. In this case, the output of the inverter IV30 is "1" during the first portion of the time interval T2 and "0" for the second portion thereof as shown in FIG. 7d. Since the time interval T2 is small (several tens of milliseconds), this intermittent operation which will cause flickering of the bulbs in the indicators I will not be defected by the human eye.

Figure 8:
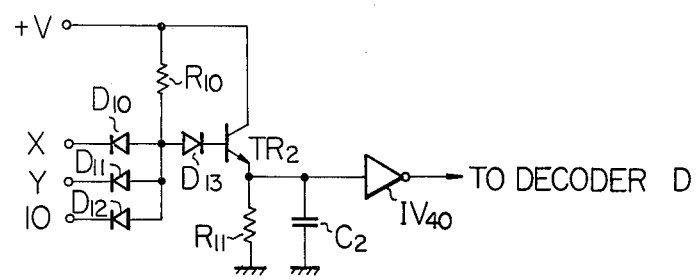
FIG. 8 is an electrical schematic diagram of another memory subunit.

Another example of a memory unit M subunit is shown in FIG. 8 and comprises diodes D10, D11 and D12 whose cathodes are connected to the wires x, y and 10. The anodes of the diodes D10, D11 and D12 are commonly connected to the source +V through a resistor R10. The anodes of the diodes D10, D11 and D12 are also connected to the anode of a diode D13, the cathode of which is connected to the base of an NPN transistor TR2. The collector of the transistor TR2 is connected to the source +V, and the emitter of the transistor TR2 is grounded through the parallel combination of a resistor R11 and capacitor C2. The emitter of the transistor TR2 is also connected to the input of an inverter IV40 which is identical to the inverter IV30. The values of the resistors R10 and R11 and the current amplification factor hfe of the transistor TR2 are selected in accordance with the following relation $$\frac{R10}{hfe(R11)} < \frac{t1}{T2}$$

Figure 9A:
FIGS. 9a to 9c represent a timing chart for the memory subunit shown in FIG. 8.
Figure 9B:
Figure 9C:
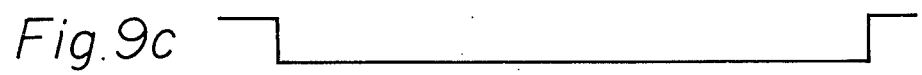

Referring also to FIGS. 9a to 9c, when the signals on either of the wires x, y and 10 is "0", the transistor TR2 is cut off and the capacitor C2 is discharged to zero through the resistor R11. This zero voltage applied to the input of the inverter IV40 produces a "1" output. When all of the signals on the wires x, y and 10 are "1", the transistor TR2 conducts and the capacitor C2 charges through the transistor TR2 as shown in FIG. 9b. After the time t1, the transistor TR2 is again cut off and the capacitor C2 discharges through the resistor R11. In the example shown, the capacitor C2 does not discharge below the voltage +V/2 in the time T2 so that the output of the inverter IV40 is "0" until the signal on the wire 10 becomes "0". The subunit shown in FIG. 8 may of course be adapted to provide an intermittent output of the type shown in FIG. 7d.

The present invention is not limited to the particular embodiments shown since the scope thereof is broad. Many modifications will become possible to one skilled in the art after receiving the teachings of the present invention. A modification such as, for example, providing the response memory unit MR with a random access memory rather than with a plurality of shift registers, the random access memory being addressed in synchronism with the scanning of the response transmission units RT1 to RTn, would be completely within the scope of the present invention. It is also possible to odd bulbs to the response indicator unit RI to display the actual responses in addition to their correctness computing means for performing various statistical calculations on the responses way of course also be added.

What is claimed is:

1. A group response system, comprising:
   a plurality of response transmission units each having a switch means for manually selecting one of a plurality of possible responses;
   a response memory having a plurality of memory elements equal in number to the number of response transmission units, the response memory unit comprising sensing means to normally inhibit the input of the response memory unit, sense a condition in which the switch means of one of the response transmission units is manually actuated to select a new response and enable the input of the response memory unit to enter the new response into the respective memory element, the sensing means comprising a parity generator;
   a transmission line means, the output of the response transmission units being connected in parallel to one end of the transmission line means, the other end of the transmission line means being connected to the input of the response memory unit; and
   a scanning means operative to synchronizingly scan the response transmission units to sequentially actuate the response transmission units to transmit their respective responses to the response memory unit through the transmission line means and actuate the response memory unit so that the respective responses are stored in the respective memory elements.

2. A system according to claim 1, in which the sensing means comprises a decoder.

3. A system according to claim 1, in which the switch means of each response transmission unit comprises reset means manually actuable to command deletion of the respective response, the sensing means of the response memory unit being further operative to sense the deletion command and control the response memory unit to delete the contents of the respective memory element.

4. A system according to claim 1, in which the response memory unit comprises a shift register, the scanning means being operative to serially store the responses in the shift register.

5. A system according to claim 4, in which the scanning means is operative to apply shift pulses to the shift register continuously in synchronism with scanning the response transmission units.

6. A system according to claim 1, in which the response memory unit comprises a shift register, the scanning means being operative to sequentially store the responses in the shift register, the sensing means comprising gate means to normally connect the output of the shift register to the input of the shift register to circulate the responses through the shift register and to connect the transmission line means to the input of the shift register when the sensing means senses a condition in which one of the response transmission units is manually actuated to select a new response.

7. A system according to claim 6, in which the switch means of each response transmission unit comprises reset means manually actuable to command deletion of the respective response, the sensing means of the response memory unit being further operative to sense the deletion command and control the gate means to disconnect the output of the shift register from the input of the shift register and disconnect the transmission line means from the input of the shift register in response thereto to store a blank response into the respective memory element.

8. A system according to claim 1, further comprising an indicator unit for indicating the responses stored in the response memory unit.

9. A system according to claim 1, in which each response transmission unit comprises a response indication means, the system further comprising a response line means connected at one end to the output of the response memory unit and connected at its other end in parallel to the response indication means of the response transmission units, the scanning means being further operative to actuate the response indication means to receive and indicate the output of the response memory unit corresponding to the respective response in synchronism with actuating the respective response transmission unit to transmit the response to the response memory unit.

10. A system according to claim 9, in which the transmission line means and the response line means are separate.

11. A system according to claim 9, in which the transmission line means and the response line means are integral.

12. A system according to claim 9, in which each response indication means comprises response storage means.

13. A system according to claim 1, further comprising an absentee sensing unit for sensing unused response transmission units and indicating the same to the response memory unit.

14. A system according to claim 13, in which the absentee sensing unit comprises an absentee memory for storing designations of unused response transmission units.

15. A system according to claim 14, in which the absentee memory comprises a shift register, the scanning means being operative to shift the shift register of the absentee memory in synchronism with scanning the response transmission units.

16. A system according to claim 15, further comprising a response indicator unit for indicating the responses in the response memory unit.

17. A system according to claim 16, in which the indicator unit comprises means for indicating unused response transmission units, the absentee sensing means being operative to actuate the indicator unit to indicate the unused response transmission units.

18. A system according to claim 15, in which the absentee memory unit comprises gate means to normally connect the output of the shift register to the input of the shift register and to connect the transmission line means to the input of the shift register during a roll-call operation in which each of the used response transmission units is manually actuated to transmit a response to store indications of the used and unused response transmission units in the shift register.

* * * * *